UNITED STATES PATENT OFFICE.

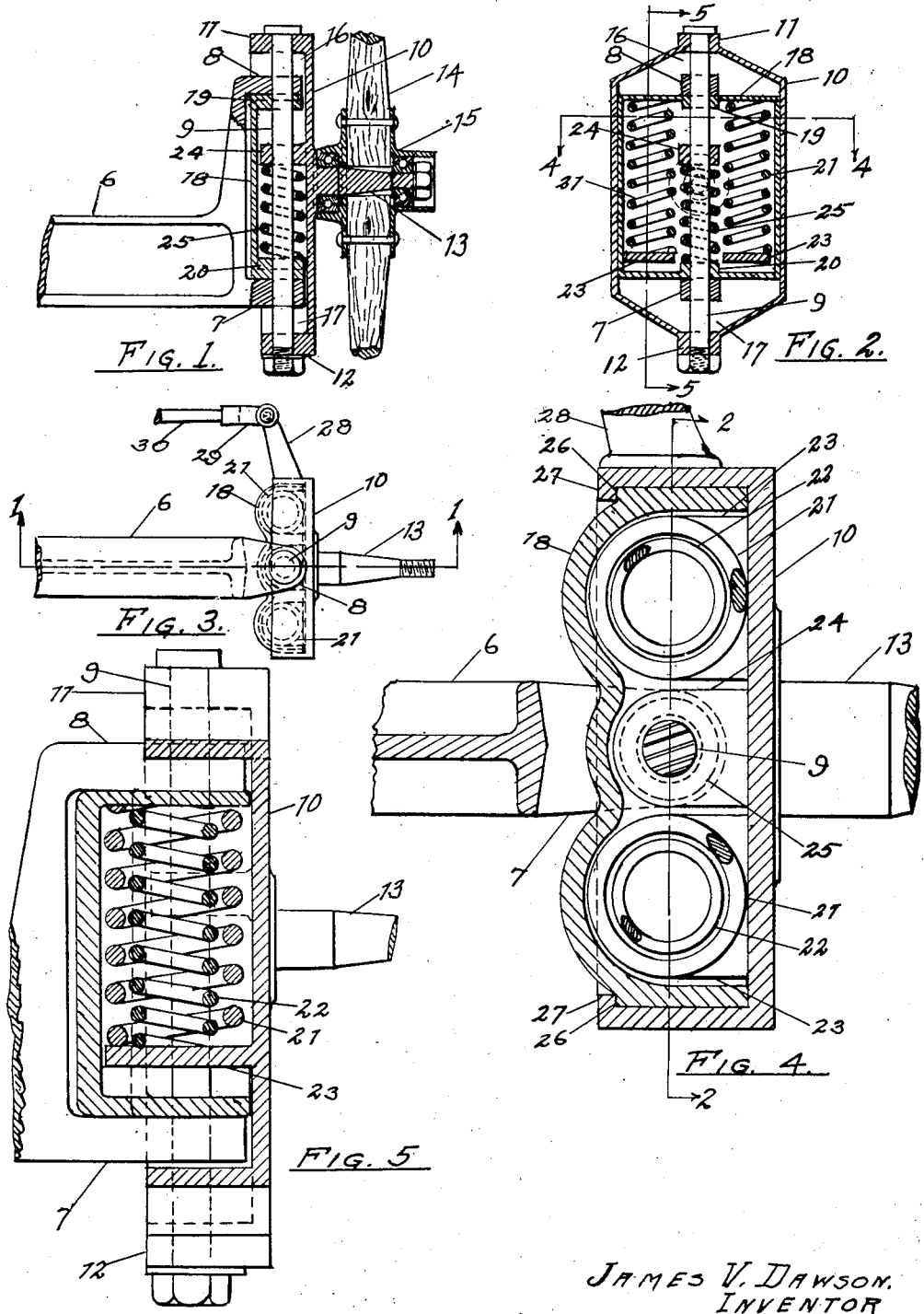

JAMES V. DAWSON, OF OSKALOOSA, IOWA, ASSIGNOR OF ONE-HALF TO JAMES L. MITCHELL, OF WHAT CHEER, IOWA.

AUTOMOBILE SHOCK-ABSORBER.

1,347,939.  Specification of Letters Patent.  Patented July 27, 1920.

Application filed July 23, 1919. Serial No. 312,753.

*To all whom it may concern:*

Be it known that I, JAMES V. DAWSON, a citizen of the United States, and a resident of the city of Oskaloosa, county of Mahaska, and State of Iowa, have invented certain new and useful Improvements in Automobile Shock-Absorbers, of which the following is a specification.

My invention relates to shock absorbers for automobiles, and more particularly to that type of shock absorber which applies to the front axle of automobiles, and more specifically to the type shown in the applicant's former Patent #1,251,348, issued December 25, 1917, on which patent the present invention is an improvement.

The principal object of this invention is to provide a shock absorber which can readily be substituted for the ordinary steering knuckle employed on such front axles. A further object is to provide a device of this sort which will not widen or separate the wheel tread nor make it necessary to shorten the axle to preserve the same wheel tread as before the device is applied.

A further object is to provide a knuckle which will eliminate the excessive lateral strains produced in the type of knuckle illustrated in the patent above referred to and also to produce a construction in which all springs will be tightly incased and protected from dust and dirt.

With these and other objects in view which will appear as this specification proceeds, my invention will be better understood by reference to the accompanying drawings which illustrate a preferred form of the invention, it being understood that such modifications thereof may be made as legitimately come within the scope of the appended claims.

With reference to the drawings in which like numerals refer to like parts throughout,—

Figure 1 is a side elevation of the assembled device partly in section on line 1—1 of Fig. 3. Fig. 2 is a vertical section on line 2—2 of Fig. 4. Fig. 3 is a plan view with the wheel removed. Fig. 4 is an enlarged horizontal section on line 4—4 of Fig. 2, and Fig. 5 is an enlarged sectional elevation on line 5—5 of Fig. 2.

In the drawings the numeral 6 indicates a portion of an automobile front axle with the customary enlarged head terminating in a lower lug 7 and an upper lug 8 which jointly carry a stud 9 vertically movable therein. 10 indicates an outer housing preferably of box-like structure, having an upper bearing 11 and a lower bearing 12 fixedly attached to said stud 9 beyond the bearings 7 and 8. Housing 10 carries the wheel spindle 13 on which is mounted a wheel 14 having the customary hub and bearings 15. A clearance space 16 is provided between bearings 11 and 8 and a similar space 17 between bearings 7 and 12. Located between the axle lugs 8 and 7 a second housing 18 is provided, the side walls of which internally engage the side walls of housing 10, housing 18 having bearings 19 and 20 slidably engaging stud 9.

Within the housing 18 a plurality of helical compression springs 21 are mounted, the upper ends of which engage the upper wall of housing 18 while the lower ends engage lugs 23 integral with housing 10. Springs 21 may be reinforced by additional springs 22 of smaller diameter if so desired. Fixedly attached also to housing 10 is an additional lug 24 fixedly engaging stud 9, a spring 25 surrounding said stud being positioned between said lug 24 and the bearing 20 on housing 18. Housing 18 may be provided with bearing surfaces 26 slidably engaging lugs 27 integral with housing 10. A steering arm 28 is attached to one side of housing 10 to which is connected the steering rod 30 and yoke or knuckle 29 to produce angular rotation of the housings 10 and 18 and consequently of spindle 13 with reference to stud 9.

From this description it will readily be seen that any motion imparted to the steering rod 30 will cause a partial rotation of spindle 13 and consequently a change of direction of travel of the automobile. Any shocks or jolts produced by the wheel traveling over irregular surfaces will be absorbed by the compression springs 21 and 22 while any rebound or upward travel of the axle 6 will be absorbed by the spring 25 acting against lug 24. It will also be seen that the wheel 14 is located in customary position with reference to stud 9, that the springs are entirely inclosed within the housings and that the side strains produced in the aforementioned patent, due to the projecting leg or spindle support, have been entirely eliminated under the present construction.

Having thus described my invention, what I claim as new and desire to protect by these Letters Patent is:

1. In combination with an automobile axle having a yoke on the end thereof, a stud slidably mounted within said yoke, a housing fixedly engaging said stud, a spindle integrally attached to said housing, a second housing internally engaging said first-mentioned housing and slidably engaging said stud within said axle yoke, helical springs within said second housing, lugs integral with said outer housing engaging one end of said springs, an additional spring surrounding a portion of said stud and engaging said second housing and a lug on said first housing, and means for rotating said housings with said stud, substantially as and for the purpose described.

2. In combination with a yoke on the end of an automobile axle, a stud vertically movable within said yoke, a housing attached to and vertically movable with said stud, a wheel bearing spindle attached to said housing, a second housing within said yoke, a plurality of symmetrically positioned helical springs within said second housing, lugs on said first housing engaging said springs, a helical spring surrounding said stud and engaging said second housing and a lug on said first housing, there being clearance spaces between the longitudinal extremities of said first housing and said second housing and said yoke, a steering arm integral with said first housing, and retaining lugs on said first housing slidably engaging said second housing to prevent separation of said first and second mentioned housings, substantially as described.

In testimony whereof I hereunto affix my signature in the presence of two subscribing witnesses.

JAMES V. DAWSON.

Witnesses:
W. T. MARTIN,
FRANCES MEEK.